(12) United States Patent
Barre et al.

(10) Patent No.: US 7,786,237 B2
(45) Date of Patent: Aug. 31, 2010

(54) POLYETHYLENE MATERIALS PREPARED USING MIXED ZIEGLER-NATTA CATALYSTS SYSTEMS

(75) Inventors: Vincent Barre, Jacksonville, FL (US); Kayo Vizzini, Pasadena, TX (US); Steven D. Gray, Florence, KY (US)

(73) Assignee: Fina Technology, Inc., Houston, TX (US)

(*) Notice: Subject to any disclaimer, the term of this patent is extended or adjusted under 35 U.S.C. 154(b) by 197 days.

(21) Appl. No.: 12/024,671

(22) Filed: Feb. 1, 2008

(65) Prior Publication Data

US 2009/0198023 A1 Aug. 6, 2009

(51) Int. Cl.
*C08F 110/02* (2006.01)
*C08F 4/42* (2006.01)

(52) U.S. Cl. .............. 526/352; 526/124.2; 526/124.3; 526/124.5; 526/124.6; 502/103; 502/115; 502/116

(58) Field of Classification Search ........... 526/352, 526/124.2, 124.3, 124.5, 124.6; 502/103, 502/115, 116
See application file for complete search history.

(56) References Cited

U.S. PATENT DOCUMENTS

| 5,798,314 | A * | 8/1998 | Spencer et al. ........... 502/115 |
| 6,914,113 | B2 | 7/2005 | McLeod |
| 7,256,247 | B2 | 8/2007 | Shamshoum |
| 2004/0229748 | A1 * | 11/2004 | Chen et al. ............. 502/118 |
| 2006/0252636 | A1 | 11/2006 | Vizzini |

FOREIGN PATENT DOCUMENTS

GB 2 028 347 A * 3/1980

OTHER PUBLICATIONS

Wang "Ethylene Polymerization Using a Novel MgC12/SiO2-supported Ziegler Natta Catalyst", Polym. Int. 55:299-304 (2006).

* cited by examiner

*Primary Examiner*—Ling-Siu Choi
(74) *Attorney, Agent, or Firm*—Tenley R. Krueger

(57) ABSTRACT

A polyethylene may be prepared using a mixture of a silica supported catalyst and a magnesium chloride supported catalyst. By changing the ratio of the two catalysts, the polyethylene produced may have a varying bulk density and shear response. The method allows for the tuning or targeting of properties to fit a specific application, such as a blow molding or vapor barrier film.

15 Claims, 3 Drawing Sheets

Melt Flow v. Fraction of Polymer for Si/Mg Supported Catalyst Mixtures

Shear Response V. Fraction of Polymer for Si/Mg Supported Catalyst Mixtures

POLYETHYLENE MATERIALS PREPARED USING MIXED ZIEGLER-NATTA CATALYSTS SYSTEMS

BACKGROUND OF THE INVENTION

1. Technical Field

This invention relates to polyethylene prepared using Ziegler-Natta catalyst systems. This invention particularly relates to polyethylene prepared using mixed Ziegler-Natta catalyst systems.

2. Background of the Art

Olefins, also called alkenes, are unsaturated hydrocarbons whose molecules contain one or more pairs of carbon atoms linked together by a double bond. When subjected to a polymerization process, olefins are converted to polyolefins, such as polyethylene and polypropylene.

Polyethylene polymers are finding increasing numbers of applications in the thermoplastics industry. These polymers offer relatively good strength and other performance properties when used in applications such as, for example, films and blow molding applications such as for preparation of bottles and the like. For these applications the polyethylene is desirably processable over a wide variety of processing conditions. It is also desirable that processing be enabled for a variety of types of processing equipment. Finally, it is desirable that the final polyethylene product exhibits good physical properties and commercially desirable appearance.

Ziegler-Natta type polyolefin catalysts, their general methods of making, and subsequent use, are known in the polymerization art. While much is known about Ziegler-Natta type catalysts, there is a constant search for improvements in their polymer yield, catalyst life, catalyst activity, amenability to use in large scale production processes, and in their ability to produce polyolefins having certain properties such as particle morphology.

Ziegler-Natta catalysts comprise a transition metal complex generally represented by the formula:

$$MR_x$$

where M is a transition metal, R is a halogen or a hydrocarboxyl, and x is the valence of the transition metal. Typically, M is a group IVB metal such as titanium, chromium, or vanadium, and R is chlorine, bromine, or an alkoxy group.

The properties of the polymerization catalyst may affect the properties of the polymer formed using the catalyst. For example, polymer morphology typically depends upon catalyst morphology. Acceptable polymer morphology differs for each class of production process (e.g., slurry loop, bimodal, gas phase, etc.), but typically includes uniformity of particle size and shape and an acceptable bulk density.

SUMMARY OF THE INVENTION

In one aspect, the invention is a process for preparing polyethylene including polymerizing ethylene monomer in the presence of a catalyst admixture, the catalyst admixture including a first silica supported Ziegler-Natta catalyst system and a second magnesium chloride supported Ziegler-Natta catalyst system.

In another aspect, the invention is a polyethylene prepared using a process including polymerizing ethylene monomer in the presence of a catalyst admixture, the catalyst admixture including a first silica supported Ziegler-Natta catalyst system and a second magnesium chloride supported Ziegler-Natta catalyst system.

In still another aspect, the invention is an article prepared with polyethylene, the polyethylene having been prepared using a process including polymerizing ethylene monomer in the presence of a catalyst admixture, the catalyst admixture including a first silica supported Ziegler-Natta catalyst system and a second magnesium chloride supported Ziegler-Natta catalyst system.

Another aspect of the invention is a catalyst admixture including a first silica supported Ziegler-Natta catalyst system and a second magnesium chloride supported Ziegler-Natta catalyst system.

BRIEF DESCRIPTION OF THE FIGURES

For a detailed understanding and better appreciation of the invention, reference should be made to the following detailed description of the invention taken in conjunction with the accompanying drawings, wherein.

DETAILED DESCRIPTION OF THE INVENTION

Figure 1:
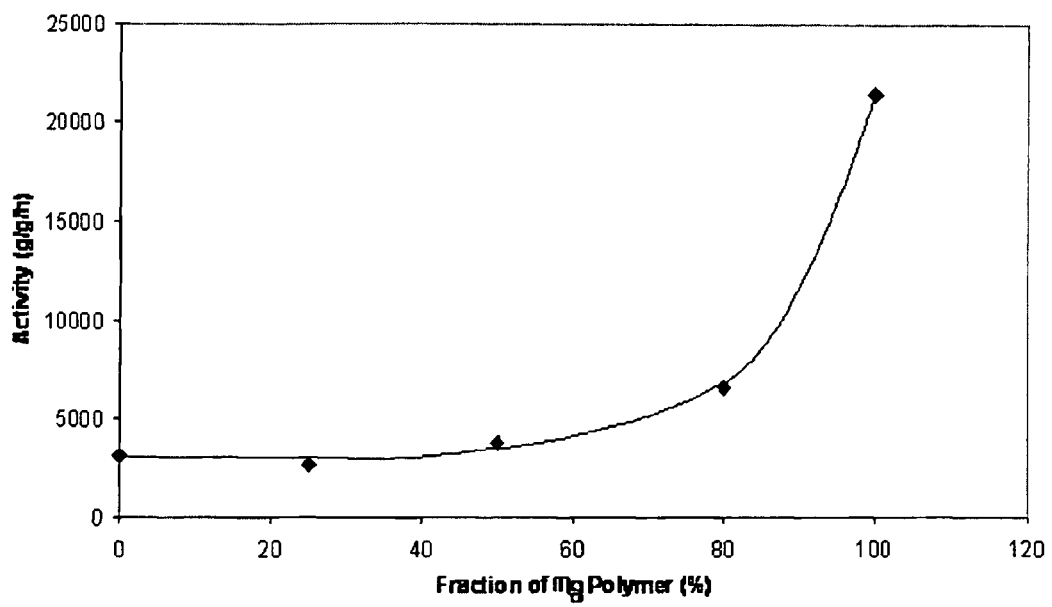
FIG. 1 is a graph of Activity v. Fraction of Polymer for Si/MgCl supported catalyst mixtures.

In one aspect, the invention is a process including polymerizing ethylene in the presence of first Ziegler-Natta catalyst system and second Ziegler-Natta catalyst system. For the purposes of the application, a Ziegler-Natta catalyst system is a Ziegler-Natta transition metal complex combined with one or more co-catalysts and optionally one or more external electron donors to form an active catalyst system. The Ziegler-Natta transition metal complexes for the first Ziegler-Natta catalyst system and the second Ziegler-Natta catalyst system may be the same or different.

In another aspect, the invention is a process for preparing polyethylene comprising polymerizing ethylene monomer in the presence of a catalyst admixture, the catalyst admixture comprising a first silica supported Ziegler-Natta catalyst system and a second magnesium chloride supported Ziegler-Natta catalyst system. The silica supported Ziegler-Natta catalyst system may be that disclosed in U.S. patent application Ser. No. 2006/0252636 published Nov. 9, 2006 which is fully incorporated in its entirety by reference. Therein, it is disclosed that a magnesium alkoxide is admixed with a group 4, 5, or 6 transition metal complex to form a magnesium transition metal alkoxide adduct having the general formula:

$$MgM(OR)_2(OR^1)_p Cl_q$$

wherein M is a group 4, 5, or 6 transition metal; R is an alkyl or aryl moiety that may have from 1 to 20 carbons and include substituted alkyl radicals; $R^1$ is a alkyl or aryl moiety having from 1 to 10 carbons, and p and q are 0 or an integer such that p+q equal the highest formal oxidation state of M. The magnesium alkoxide may be prepared by any method known to be useful to those of ordinary skill to be useful in preparing such compounds. For example, a primary alcohol having at least 2 carbons may be reacted with a magnesium dialkyl. Exemplary magnesium dialkyls include diethyl magnesium, dipropyl magnesium, dibutyl magnesium, butylethylmagnesium, and the like. Exemplary primary alcohols include methyl 2-isopropanol, 2-ethylhexanol, cyclohexylmethanol, 4-methylcyclohexylmethanol and cyclohexylethanol, and diethylene glycol monoethyl ether.

The primary alcohols may have alkyl or aryl moieties that may have 1 to 20 carbons and include, but are not limited to, substituted alkyl radicals such as —$CF_3$, —$CCl_3$, and the like; radicals including Si and silicon ethers such as —O—$SiO_2$; and aryl radicals such as a nitrobenzyl radical and an anisole radical.

Examples of transition metal complexes that may be employed include, but are not limited to, Ti, V, and, Cr-alkoxyl- and alkoxychloro-species such as $VO(O^iPr)_3$, $Ti(OBu)_4$, $VO(OiPr)_2Cl$ and $Cr(O^iPr)_3$ In some embodiments, the magnesium-transition metal alkoxide adduct is soluble in non-coordinating hydrocarbon solvents such as toluene, heptane, and hexane. Non-soluble and partially soluble magnesium-transition metal alkoxide adducts may also be used.

The preparation of the magnesium-transition metal alkoxide adducts may be done in the presence of an organometallic agent such as an aluminum alkyl wherein the aluminum alkyl acts as a compatibilizer. For example, butylethyl magnesium and triethyl aluminum (TEAl) can be contacted with 2-ethyl-2-hexanol to form a compatibilizer magnesium alkoxide which may then be reacted with $Ti(OiPr)_3Cl$ to form a catalyst precursor.

Suitable organometallic agents include but are not limited to aluminum alkyls, aluminum alkyl hydrides, lithium aluminum alkyls, zinc alkyls, magnesium alkyls and the like. In one embodiment, the organometallic agent is TEAl. Contacting the precursor with the organometallic agents may reduce solution viscosity and may also reduce byproducts such as alcohols.

The magnesium transition metal alkoxide adduct species is contacted with a silica support to form a silica supported catalyst precursor. Useful silica supports include, for example, the vitreous silicas. These are non-crystalline, synthetic products and are often referred to as fused silicas (also called fumed silica, aerosils, and pyrogenic silica). These are generally made by vapor-phase hydrolysis of silicon tetrahalides or silicon tetraalkoxides. Other methods for making fused silicas include vaporization of $SiO_2$, vaporization and oxidation of silicon, and high-temperature oxidation and hydrolysis of silicon compounds such as silicate esters. The preparation of such silicas is described, for example, in U.S. Pat. Nos. 4,243,422 and 4,098,595, the teachings of which are fully incorporated herein by reference. They may also be prepared using the methods of U.S. Pat. No. 5,232,883, also fully incorporated herein by reference wherein the supports can be prepared by spraying an electrostatically charged gellable liquid silica through a spraying orifice and into a chamber, so as to produce macrodrops which break up into microdrops which fall in the chamber and within which gelling is produced.

The silica supports are porous silica supports having a spherical or granular morphology. In one embodiment these supports have surface area of from about 250 to about 500 $m^2/g$; a pore volume of from about 1.1-2.5 mL/g; an average pore diameter of from about 170 to about 275 Å; and an average $D_{50}$ diameter of from about 10 to about 110 microns. Exemplary silica supports include P10 from Fuji Silysia Chemical Ltd., and PQ MS1733 from PQ Corporation, and the like.

The surface of the silica support may be reactive with the magnesium transition metal alkoxide adduct. The two components may be contacted in a slurry or any other method known to those of ordinary skill in the art of preparing supported catalysts. In some embodiments the application of the magnesium transition metal alkoxide adduct to the silica support may be performed at temperatures ranging from about −40 to about 200° C. In another embodiment, the application is performed at from about 0 to about 100° C. and in still another embodiment, at from about 20 to about 35° C.

In some embodiments the supported catalyst precursor is next halogenated to form a halogenated supported catalyst. It may also be titanated and halogenated. Agents useful for halogenating a silica supported catalyst include any halogenating agent which will yield a suitable catalyst. Some of the halogenating agents may also serve as titanating agents useful for incorporating titanium into the supported catalyst. For example, $TiCl_4$ may both titanate and halogenate a catalyst precursor.

Metal chlorides may be desirable halogenating agents and/or titanating/halogenating agents. Non-limiting examples of suitable halogenating and/or titanating/halogenating agents include Group III, Group IV and Group V halides, hydrogen halides, or the halogens themselves. Specific examples of halogenating and/or titanating/halogenating agents are $BCl_3$, $AlCl_3$, $CCl_4$, $SiCl_4$, $TiCl_4$, $ZrCl_4$, $VOCl_4$, $VOCl_2CrOCl_2$, $SbCl_5$, $POCl_2$, $PCl_5$, $HfCl_4$, and $Ti(OR^1)_nCl_{4-n}$, wherein $R^1$ is an alkyl having 1 to 8 carbon atoms, and n is from 0 to 4. Mixtures of any of two or more of the foregoing may also be used as halogenating and/or titanating/halogenating agents. Other halogenating and/or titanating/halogenating agents include alkyl halides such as $PhCH_2Cl$ and PhCOCl and alkylhalosilanes of the formula $R'_nSiX_{(4-n)}$, wherein X is a halogen, R' is a substituted or unsubstituted hydrocarbyl having 1 to 20 carbon atoms, and n is 1-3

Examples of halogenating and/or titanating/halogenating agents are $SiCl_4$, $TiCl_4$, $TiCl_n(OR)_{4-n}$, and mixtures of any of two or more of the foregoing. One embodiment employs as the halogenating agent a mixture of $TiCl_4$, and $Ti(OR)_4$, wherein R is a butyl group. In another embodiment, R is a propyl group. In one embodiment the molar ratio of $TiCl_4$ to $Ti(OR)_n$ is generally in the range of about 4 to about 0.1, may be in the range of about 3 to about 1, and may be in the narrower range of about 2 to about 1.

There is generally at least one halogenation step, and there may be two or more. A non-limiting example of a suitable halogenation treatment includes a first halogenation treatment with a mixture of $TiCl_4$ and $Ti(OBu)_4$, followed by a second halogenation treatment with $TiCl_4$. Halogenation and titanation of catalysts and catalyst precursors is disclosed in U.S. Pat. No. 6,693,058 to Coffy, et al., the contents of which are fully incorporated herein by reference.

The halogenation and titanation of the catalyst precursor may be carried out under conditions suitable to yield the desired catalyst component. Suitable temperatures for halogenating and titanating are generally in the range of about −20° C. to about 100° C. in some embodiments, may be in the range of about 0° C. to about 75° C. and may be in the narrower range of about 25° C. to about 65° C. in other embodiments.

Halogenation in one embodiment may be conducted at a molar ratio of halogenating agent to catalyst in the range of about 1 to about 20, or about 1 to about 10, and may even be in the narrower range of about 1 to about 8.

The catalyst made by the above described process may be further combined with a cocatalyst component to generate a catalyst system suitable for the polymerization of olefins. In one embodiment, the cocatalyst which used together with the transition metal containing catalyst is and organometallic compound of Group Ia, IIa, and IIIa metals such as aluminum alkyl, zinc alkyl, magnesium alkyl, mixtures thereof and the like. Exemplary Organometallic compounds that may be employed are trialkylaluminum compounds. In one embodiment, the cocatalyst component is TEAl.

The magnesium supported Ziegler-Natta catalyst may be any known to those of ordinary skill in the art. In one embodiment of the invention the magnesium supported Ziegler-Natta catalyst is one prepared by a process having at least three steps: (1) preparation of a dialkoxide as the reaction product of a metal dialkyl and an alcohol; (2) preparation of a soluble catalyst precursor as the reaction product of the metal dialkoxide and a halogenating/titanating agent; and (3) precipitation of a final solid catalyst component as the reaction product of the soluble catalyst precursor and a precipitating agent. The precipitating agent may in some embodiments also be a halogenating/titanating agent. While additional steps may also be included in practicing the invention, as will be known to those skilled in the art, such as, for example, additional halogenating/titanating steps, the three enumerated steps may be considered to be those conventionally employed, although execution of each step may occur at a different site or manufacturing facility.

The metal dialkyls may include Group IIA metal dialkyls. The metal dialkyl may be, for example, a magnesium dialkyl. Suitable and non-limiting examples include diethyl magnesium, dipropyl magnesium, dibutyl magnesium, butylethyl magnesium (BEM), and the like. In one embodiment butylethyl magnesium may be employed.

The alcohol may be, in one embodiment, any compound represented by the formula $R^1OH$ and yielding the desired metal dialkoxide upon reaction as described hereinabove may be utilized. In the given formula $R^{1'}$ may be an alkyl group of 2 to 20 carbon atoms. Non-limiting examples of suitable alcohols include ethanol, propanol, isopropanol, butanol, isobutanol, 2-methyl-pentanol, 2-ethylhexanol, and the like. While it is believed that almost any alcohol may be utilized, whether linear or branched, a higher order branched alcohol, for example, 2-ethyl-1-hexanol (also called 2-ethylhexanol), may be utilized in particular embodiments.

The amount of alcohol relative to the metal dialkyl may vary over a wide range, provided that the result is the desired metal alkoxide. For example, a level of from about 0.01 to about 10 equivalents of alcohol relative to the metal dialkyl may be employed. In some embodiments a level ranging from about 0.5 to about 6 equivalents may be used, and in other embodiments a level ranging from about 1 to about 3 equivalents may be selected.

A problem that may be encountered when a selected metal dialkyl is added to a solution may be a dramatic increase in the solution's viscosity. This undesirably high viscosity may be reduced by adding to the solution an aluminum alkyl, such as, for example, TEAl, which operates to disrupt the association between the individual alkyl metal molecules. In some embodiments it may be therefore desirable to include the alkyl aluminum, in an alkyl aluminum-to-metal ratio of from 0.001:1 to 1:1. In other embodiments the ratio may be from 0.01:1 to 0.5:1; and in still other embodiments the ratio may be from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and may range from 0.1:1 to 1:1, and is further discussed below.

In the practice of the invention, the metal dialkoxide produced by the reaction of dialkyl metal and alcohol may be a magnesium compound of the general formula $Mg(OR^2)_2$ wherein $R^2$ may be a hydrocarbyl or substituted hydrocarbyl of 1 to 20 atoms. In one embodiment, the metal dialkoxide may be non-reducing. Non-limiting examples of species of metal dialkoxides which may be used include magnesium di(2-ethylhexoxide) and other Group IIA metal dialkoxides, may be produced by reacting an alkyl magnesium compound $(MgR^3R^4$, i.e., a metal dialkyl wherein $R^3$ and $R^4$ may be each independently any alkyl group of 1 to 10 carbon atoms) with an alcohol ($R^1OH$) and an aluminum alkyl ($AlR^5_3$) wherein $R^5$ may be any alkyl group of 1 to 10 carbon atoms. Suitable magnesium dialkyl compounds include, for example, diethyl magnesium, dipropyl magnesium, dibutyl magnesium, and butylethyl magnesium (BEM). The $MgR^3R^4$ compound may be BEM, wherein the reaction products, in addition to the magnesium dialkoxide, may be denoted as $R^3H$ and $R^4H$ and may be butane and ethane, respectively.

In the second step of the generalized reaction scheme, the metal dialkoxide may be reacted with a halogenating agent to form a soluble catalyst precursor. This step may be accomplished in one or several parts. In this case a compound conforming to the formula $ClAR^6_x$ may in some embodiments be selected as the halogenating agent. In the formula, A may be a nonreducing oxyphilic compound which may be capable of exchanging one chloride for an alkoxide, $R^6$ may be a hydrocarbyl or substituted hydrocarbyl, and x may be the valence of A minus 1. Examples of A include titanium, silicon, aluminum, carbon, tin and germanium, and in some embodiments titanium or silicon wherein x may be 3. Where titanium is included, the agent may be referred to as a halogenating/titanating agent. Examples of $R^6$ include methyl, ethyl, propyl, isopropyl and the like having from 2 to 6 carbon atoms. A non-limiting example of a halogenating/titanating agent that may be used is $ClTi(OiPr)_3$ and, as a halogenating agent, $ClSi(Me)_3$, wherein Me is methyl and iPr is isopropyl.

The halogenation may be conducted according to some embodiments in a hydrocarbon solvent under an inert atmosphere. Non-limiting examples of suitable solvents include toluene, heptane, hexane, octane and the like. In this halogenating step, the mole ratio of metal alkoxide to halogenating agent is, in some embodiments, in the range of about 6:1 to about 1:3, and in other embodiments from about 3:1 to 1:2, and in still other embodiments from about 2:1 to 1:2, and in yet other embodiments may be about 1:1.

Halogenation, for example, may be carried out at a temperature from about 0° C. to about 100° C. and for a reaction time, for example, in the range of from about 0.25 to about 24 hours. In other embodiments a temperature of from about 20° C. to about 90° C. may be used, and the reaction time, for example, may range from about 1 hour to about 4 hours.

The halogenation, in this case, chlorination, that takes place results in a reaction product which is the soluble catalyst precursor, which may in some embodiments be of uncertain composition. Such a product is, in some embodiments, a partially halogenated metal compound, which may represented by the formula $XMg(OR^1)$, wherein X may be a halogen and $R^1$ may be an alkyl group of 2 to 20 carbon atoms as already defined. For example, the product may be an adduct, which is defined herein as representing an association complex. One such adduct or complex could be, for example, $Mg(O-2-EtHex)_2 \cdot ClTi(O^iPr)_3$, wherein EtHex is ethylhexoxide. Any compound having the general formula $ClTi(OR^a)_3$ wherein $R^a$ is a linear or branched $C_2$ to $C_{20}$ alkyl or alkyl moiety may also be used with the present invention as this product. Regardless of the constituents or the nature of their association, the soluble catalyst precursor in some embodiments is substantially soluble, which is defined herein as having a solubility of at least about 90 percent by weight, and in desirable embodiments more than about 95 percent by weight, in the catalyst synthesis solution.

Following formation of the soluble catalyst precursor, a halogenating/-titanating agent may be used for the purpose of precipitating the desired final solid catalyst component. Thus, this agent is herein referred to as the "precipitating agent" in order to more clearly separate it, by virtue of its effect, from other halogenating agents, some of which may contain titanium and therefore double as titanating agents, that may be used in forming the soluble catalyst precursor via reaction of that agent with the metal dialkoxide. The precipitating agent may be, in some embodiments, blends of two tetra-substituted titanium compounds with all four substituents being the same and the substituents being a halide or, in alternative embodiments, an alkoxide or phenoxide with from 2 to 10 carbon atoms, such as $TiCl_4$ and $Ti(OBu)_4$ wherein Bu is butyl. In other embodiments, the precipitating agent may be a single compound.

If a blend is chosen, a combination of a titanium halide and an organic titanate may, in some embodiments, be selected. For example, a blend of $TiCl_4$ and $Ti(OBu)_4$, may be utilized. In some desirable embodiments a blend of $Ti(OBu)Cl_3$ and $Ti(OBu)_2Cl_2$ may be selected as the precipitating agent. Where a blend of $TiCl_4$ and $Ti(OBu)_4$ is selected, for example, the proportion of the constituents may vary over a range of from 0.5:1 to 6:1, and in some embodiments from about 2:1 to 3:1.

In some embodiments the precipitation may be carried out at room temperature. The solid catalyst component may be then recovered by any suitable recovery technique known to those skilled in the art, and then desirably washed at room/ambient temperature with a solvent, such as hexane. In one embodiment, the solid catalyst component is washed until the [Ti] may be less than about 100 mmol/L. [Ti] represents any titanium species capable of acting as a second generation Ziegler catalyst, which would comprise titanium species that are not part of the reaction products as described herein. The resulting catalyst component may then, in some embodiments, be subjected to additional halogenation/titanation steps, if desired, to produce alternative and/or additional catalyst products. After each halogenation/titanation step the solid product may be in some embodiments washed until the [Ti] may be less than a desired amount, for example, less than about 100 mmol/L, less than about 50 mmol/L, or less than about 20 mmol/L.

In embodiments where halogenation/titanation agents are desired following the precipitation step, a titanium halide, such as titanium tetrachloride ($TiCl_4$), for example may be selected. In this case the halogenation/titanation agent may be added to the slurry. While this addition may be often carried out at ambient/room temperature, it may also be carried out at other temperatures and pressures and under a variety of conditions. The amount of such additional agent may be in a titanium to magnesium ratio of from about 0.1 to 5.0 equivalents, in other embodiments desirably about 2.0, and in other embodiments from about 0.25 to about 4, in still other embodiments from about 0.3 to about 3 equivalents, and in still other embodiments from about 0.4 to about 2.0 equivalents. In one desirable embodiment, the amount of the halogenating/titanating agent utilized in post-precipitation steps may be from about 0.45 to about 1.5 equivalents.

An internal electron donor for treating the supported catalyst or catalyst precursor may be used in some embodiments. The internal electron donor may be added during or after the halogenation step. Internal electron donors for use in the preparation of polyolefin catalysts are known, and any suitable internal electron donor may be utilized that will provide a suitable catalyst. Internal electron donors, also known as Lewis bases, are organic compounds of oxygen, nitrogen, phosphorous, or sulfur which are capable of donating an electron pair to the catalyst. The internal electron donor may be a monofunctional or polyfunctional compound, and may be selected from among the aliphatic or aromatic carboxylic acids and their alkyl esters, the aliphatic or cyclic ethers, ketones, vinyl esters, acryl derivatives, particularly alkyl acrylates or methacrylates and silanes. The amount of internal electron donor utilized may vary over a broad range and is generally in the range of about 0.01 to about 2 equivalents, but may be in the range of about 0.05 to about 0.5 equivalents. The catalyst precursor may be contacted with the internal electron donor for a contacting period in the range of about 0.5 hours to about 4 hours in some embodiments. In one embodiment a range of about 1 hour to about 2 hours is employed.

External electron donors that may be added at the end of the preparation or utilized with the use of catalyst during polymerization and include those known in the art, including, but not limited to alkoxysilanes.

The process of the invention may be performed in a solvent. The process may be performed in any suitable solvent or reaction medium. Non-limiting examples of suitable solvents or reaction media include toluene, heptane, hexane, octane and the like. A mixture of solvents may also be used.

The catalysts (including catalyst precursors, catalysts and catalysts systems) described herein may be used for the polymerization of olefins, including α-olefins. For example, the present catalyst is useful for catalyzing ethylene, propylene, butylene, pentene, hexene, 4-methylpentene and other alkenes having at least 2 carbon atoms, and also for mixtures thereof. These catalysts may be utilized for the polymerization of ethylene to produce polyethylene. Such olefin polymerization methods are well known in general, and any suitable method may be utilized.

The invention includes polymerizing ethylene to prepare polyethylene using a mixture of a magnesium chloride supported catalyst and a silica supported catalyst. These catalysts, while both Ziegler-Natta type catalysts, may have different properties when used alone to prepare polymers. Generally, the magnesium chloride supported catalysts have comparatively high activity, produce polymers (and copolymers) having a comparatively narrow molecular weight distribution, and a low shear response. In contrast, the silica supported catalysts useful with the method of the invention have a comparatively low activity and high shear response, and may be used to prepare polymers (and copolymers) having a comparatively broad molecular weight distribution.

The method of the invention may be used to obtain, for example, film with excellent physical and processing properties. The mixing of the catalysts may be performed such that all of the referenced properties of the polymer may be affected, but in one embodiment, the method of the invention may be used to desirably improve the rheological properties of the polymers produced. Specifically, by adjusting the relative percentage of polymer from each catalyst in the product polymer, the bulk density and the breadth parameter can be materially changed. This allows for the "tuning" of polymer properties toward a specific application.

For example, in one embodiment of the invention, the shear thinning of the polymer may be increased. Polymers with good or comparatively high shear thinning are useful in blow molding application. In the alternative, the shear thinning of a polymer may be lowered or decreased with the resulting polymer, in some embodiments, being useful for barrier film applications.

Generally speaking, rheological breadth refers to the breadth of the transition region between Newtonian and power-law type shear rate or frequency dependence of the viscosity and is a function of the relaxation time distribution of the resin, which in turn is a function of a resin's molecular architecture. The breadth parameter is experimentally determined assuming Cox-Merz rule by fitting flow curves generated using linear-viscoelastic dynamic oscillatory frequency sweep experiments with a modified Carreau-Yasuda (CY) model. According to the Cox-Mertz method, the magnitude of the complex viscosity is equal at equal values of radial frequency and shear rate. Cox, W. P. and Mertz, E. H., "Correlation of Dynamic and Steady Flow Viscosities," *J. Polym. Sci.*, 28 (1958) 619-621. Further details regarding the (CY) model may be found: Hieber, C. A., Chiang, H. A., *Rheol. Acta.*, 28, 321 (1989); Hieber, C. A., Chiang, H. H., *Polym. Eng. Sci.*, 32, 931, (1992). The "a" parameter is calculated:

$$\eta = \eta_\beta [1+(\lambda Y)a]^{n-1/a}$$

where:
η=viscosity (Pa·s);
Y=shear rate (1/s);
a=rheological breadth [describes the breadth of the transition region between Newtonian and power law behavior];
λ=relaxation time sec [describes the location in time of the transition region]; and
n=power law constant [defines the final slope of the high shear rate region].

To facilitate model fitting, the power law constant (n) is held at a constant value, e.g., n=0. An increase in the rheological breadth of a resin is seen as a decrease in the value of the breadth parameter, a, for a resin.

In some embodiments, the rheological breadth parameter is from about 0.11 to about 0.26. In other embodiments, the rheological breadth parameter is from about 0.15 to 0.24 or from about 0.17 to about 0.20.

Shear thinning or shear response is a measure used to estimate the processability of polyethylene resins. Shear response is ratio of HLMI and MI5. HLMI and MI5 are determined using the procedures of ASTM D 1238 and using respective loads of 5.0 kg and 21.6 kg at a temperature of 190° C. The MI5 and the HLMI are broadly inversely indicative of the molecular weight distribution of the polymer. The shear response for the polymers prepared with the method of the invention may range in some embodiments from about 9 to about 18. In other embodiments, the range in the value for the shear response may be from about 12 to about 15. In still other embodiments, the shear response is from about 13-14.

The method of the invention may be used in any way known to be useful to those of ordinary skill in the art of preparing polyethylene. For example, the method may be used with single loop reactors or double loop reactors. The method may be used with stirred and/or unstirred vessel reactors. In one embodiment, the silica supported and magnesium chloride supported catalysts are fed concurrently into a reactor. In an alternative embodiment, the two catalyst systems are fed sequentially. In still another embodiment, one of the catalysts systems is fed into the first loop of a double loop reactor while the second catalyst system is feed into the second loop of the double loop reactor.

The mixed catalyst system of the invention may be present in any ratio useful for preparing polyethylene known to those of ordinary skill in the art. For example, in one embodiment, the weight percent ratio of silica supported catalyst to magnesium supported catalyst is from 50:1 to 1:50. In another embodiment it is from 25:1 to a1:25. In still another embodiment, it is from 1:9 to 9:1. In another embodiment, the ratio is from 1:4 to 4:1 and in still another embodiment the ratio is from 3:7 to 7:3. In yet another embodiment the ratio is from 2:3 to 3:2 or 1:1.

The polymers produced according to the method of the invention may have polymer fractions that are attributable to each of the catalysts used. For example, in one embodiment, the weight percentage of the polymer attributable to the silica supported catalyst may be from about 80 to about 20 percent. In another embodiment, the weight percentage of the polymer attributable to the silica supported catalyst may be from about 60 to about 40 percent. In still another embodiment, the weight percentage of the polymer attributable to the silica supported catalyst may be about 50 percent.

The polyolefins of the present invention may be desirably suitable for use in a variety of applications such as, for example, in extrusion processes, to yield a wide range of products. These extrusion processes include, for example, blown film extrusion, cast film extrusion, slit tape extrusion, blow molding, pipe extrusion, and foam sheet extrusion. These processes may comprise mono-layer extrusion or multi-layer coextrusion. End use applications may include, for example, films, fibers, pipe, textile material, feminine hygiene products, food packaging, grocery sacks, pressure rated pipes and the like.

The method of the invention may be practiced using ethylene to produce a homopolymer. For the purposes of the invention, the terms polymer and polyethylene are defined to include, in addition to polyethylene homopolymer, copolymers of ethylene and other monomers. Examples of comonomers which can be used with the method of the invention include 1-olefins such as propylene, butene, hexene, octene, 4-methyl-pentene, and the like, as well as mixtures thereof up to $C_{12}$ 1-olefins. In one embodiment, desirably the comonomer is hexene.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES

Example 1

A Si supported catalyst and Mg chloride supported catalyst were used. The two catalysts were admixed in the ratios shown below in Table 1. For each sample, the catalyst admixture was used to prepare polyethylene according to the conditions shown in Table 2. The resultant resin was recovered and subjected to physical testing.

The silica supported catalyst was prepared using A 100 mL Schlenk flask which is charged with BEM (1.6 mmol), TEAl (0.143 mmol), and hexane (50 mL). With rapid stirring, a solution of 2-ethylhexanol (3.68 mmol) in hexane (10 mL) was added dropwise to the flask. The mixture was stirred for 1 hour. A solution of $ClTi(O^iPr)_3$ (1.6 mmol) in hexanes (10 mL) was added to the reaction mixture. After 1 hour, this solution was then transferred to the Schlenk flask containing 2.0 g of silica, the silica having the properties shown in Table 3. The slurry was stirred for 1 hour. Agitation was then discontinued and the solid was allowed to settle. The supernatant was decanted and the solid is washed with hexane (3×50 mL). The solid was resuspended in hexane (80 mL) and $TiCl_4$ (6.4 mmol) was added dropwise. After the addition was complete, the slurry was mixed for an additional 1.5 hours. After this time, the solid was allowed to settle and the supernatant was decanted. The resultant yellow solid was washed (3×50 mL hexane) and resuspended in hexane (100 mL). A solution of TEAl (0.25 mmol) was added drop wise to the slurry. The mixture was agitated for 1 hour. The supernatant was decanted and the resultant brown solid was washed with hexane (50 mL) and dried under vacuum.

The magnesium chloride supported catalyst was prepared using a 1.0 L Buchi reactor that was baked out at a temperature of slightly above about 100° C. for more than 12 hours while under a strong nitrogen purge. In a 250 mL pop bottle, 53.64 g of 20.6 weight percent butylethyl magnesium (0.11 Al weight percent) was collected and diluted to 200 mL total volume with hexane. This clear, colorless solution was transferred by cannula to a Buchi reactor. The pop bottle was then rinsed with 100 mL hexane that was added to the reaction. Agitation was started at 200 rpm.

In a 100 mL graduated cylinder, 26.90 g of neat 2-ethylhexanol was collected, then diluted to 50 mL total volume with hexane. This clear, colorless solution was cannula-transferred to the solution in the Buchi reactor over 23 minutes. The solution temperature increased from 24.1° C. to 34.5° C. The resulting solution was viscous, clear, and colorless. When the addition is complete, the graduated cylinder is rinsed into the reactor with about 35 mL of hexane and the contents, i.e., the magnesium alkoxide, was stirred for one hour.

In a 250 mL pop bottle, 77.50 g of 1.0M ClTi(OiPr)$_3$ got use as the halogenating/titanating agent was collected (about 100 mL volume). This slightly yellow, clear liquid was cannula-transferred to the Buchi over 24 minutes. After the addition, the pop bottle was rinsed with about 15 mL hexane into the Buchi. The reaction was allowed to stir for one hour.

In a 500 mL graduated cylinder, 239.9 g of a 30 weight percent 2TiCl$_4$/Ti(OBu)$_4$ mixture, as a precipitating agent, was collected (about 310 mL volume). This grayish-orange liquid was cannula-transferred to the reaction over 64 minutes. The mixture was stirred for 1 hour. This reaction product was settled and the supernatant was then decanted. The resulting solids were washed three times with 200 mL of hexane and the solids were then suspended in 200 mL of hexane. In a 100 mL graduated cylinder, 100 mmol (19.0 g) of TiCl$_4$ was collected, and then diluted to 50 mL total volume with hexane. This solution was cannular transferred to the solution in the Buchi reactor at room temperature over 20 minutes. The reaction mixture was stirred at room temperature for another hour. The reaction mixture was settled and the supernatant was then decanted. The solids were washed with 200 mL of hexane. The solids were then suspended in 200 mL of hexane. In a 100 mL graduated cylinder, 100 mmol (19.0 g) of TiCl$_4$ was collected, and then diluted to 50 mL total volume with hexane. This solution was cannular transferred to the solution in the Buchi reactor at room temperature over 20 minutes. The reaction mixture was then stirred at room temperature for another hour. The reaction mixture was settled and the supernatant was then decanted. The solids were washed with 200 mL of hexane three times. The solids were then suspended in 150 mL of hexane.

In a 100 mL graduated cylinder, 16 mmol (7.39 g) of TEAl was collected, and then diluted to 50 mL total volume with hexane. This solution was cannular transferred to the solution in the Buchi reactor at room temperature over 25 minutes. The catalyst was then stirred at room temperature for another hour. The catalyst was then decanted and re-slurried in 200 mL of hexane.

Figure 2:
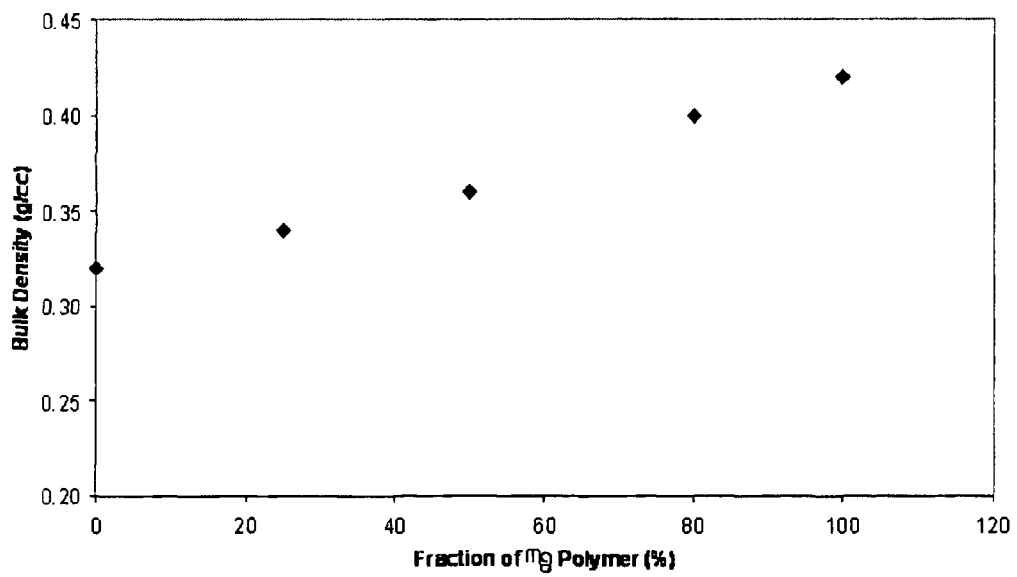
FIG. 2 is a graph of Bulk Density v. Fraction of Polymer for Si/MgCl supported catalyst mixtures.
Figure 3:
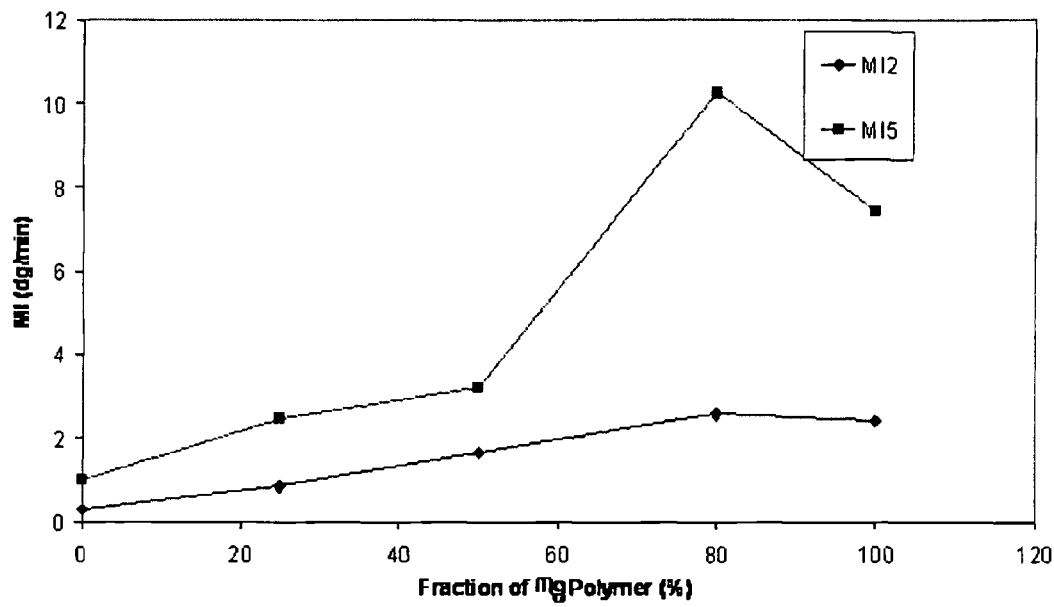
FIG. 3 is a graph of Melt Flow v. Fraction of Polymer for Si/MgCl supported catalyst mixtures.
Figure 4:
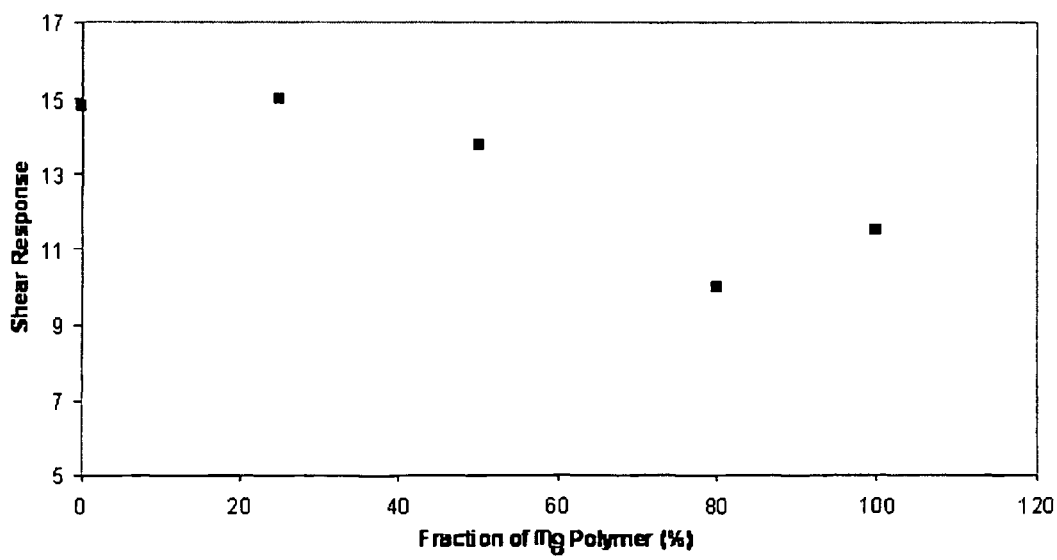
FIG. 4 is a graph of Shear Response V. Fraction of Polymer for Si/MgCl supported catalyst mixtures.
Figure 5:
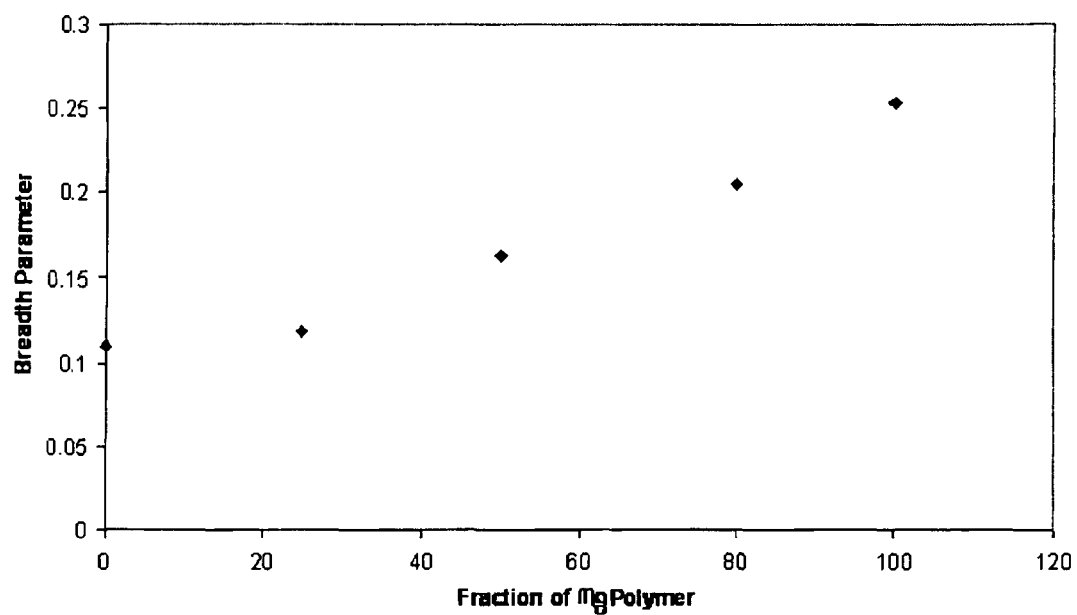
FIG. 5 is a graph of Breadth Parameter Versus Fraction of Polymer for Si/MgCl supported catalyst mixtures.

After each polyethylene was prepared, the samples were tested for Activity and the results are shown in FIG. 1. The Samples were tested for bulk density and the results are shown in FIG. 2. The samples were tested for Melting Index values and the results are shown in FIG. 3. The samples were tested for Shear response and the results are shown in FIG. 4. The samples were tested for rheological breadth and the Breadth Parameter is displayed in FIG. 5.

TABLE 1

Catalyst Mixtures Employed

| Experiment | Catalyst amount (mg) | | Fraction of Polymer | |
| --- | --- | --- | --- | --- |
| No | Si | Mg | Si | Mg |
| 1 | 0 | 17.7 | 0 | 100 |
| 2 | 50 | 14.0 | 20 | 80 |
| 3 | 100 | 8.85 | 50 | 50 |
| 4 | 160 | 3.54 | 80 | 20 |
| 5 | 200 | 0 | 100 | 0 |

TABLE 2

Polymerization Conditions

| Pressure (Psig) | 125 |
| --- | --- |
| Temperature ((C.) | 80 |
| Diluent | Hexane |
| Cocatalyst | TIBAl |
| (mmol/L) | (0.25) |
| H2 Flow Rate (SLPM) | 2 |
| C2 Flow Rate (SLPM) | 8 |
| Polymerization Time (h) | 1 |

TABLE 3

Silica Support Properties.

| Surface Area (m2/g) | Pore Volume (mL/g) | Ave. Pore Diameter (Å) | D50 (micron) | Si—OH (unit/nm2) | Si—OH (mmol/g) |
| --- | --- | --- | --- | --- | --- |
| 281 | 1.65 | 185 | 20 | 5.2 | 0.612-1.94 |

Discussion of the Samples

The results of the experiments show that by varying the ratio of the two catalyst system being used, bulk density, melt flow properties, shear response, and Theological breadth of polymers prepared therewith can be manipulated or adjusted.

What is claimed is:

1. A process for preparing polyethylene comprising polymerizing ethylene monomer in the presence of a catalyst admixture, the catalyst admixture comprising a first silica supported Ziegler-Natta catalyst system, wherein the first catalyst and the second catalyst are introduced into a reactor individually; and a second magnesium chloride supported Ziegler-Natta catalyst system.

2. The process of claim 1 wherein the first silica supported catalyst and the second catalyst are admixed and introduced into a reactor.

3. The process of claim 1 wherein the first catalyst and the second catalyst are introduced into a reactor sequentially.

4. The process of claim 1 wherein the first catalyst and second catalyst are introduced into a reactor concurrently.

5. The process of claim 1 further comprising using an internal electron donor.

6. The process of claim 1 further comprising the use of an external electron donor.

7. The process of claim 1 further comprising the use of a solvent selected from the group consisting of toluene, heptane, hexane, octane, and mixtures thereof.

8. The process of claim 1 wherein the silica supported Ziegler-Natta catalyst system is prepared using a silica support having a surface area of from about 250 to about 500 m²/g; a pore volume of from about 1.1-2.5 mL/g; an average pore diameter of from about 170 to about 275 Å; and an average $D_{50}$ diameter of from about 10 to about 110 microns.

9. The process of claim 1 wherein the ratio of the first silica supported Ziegler-Natta catalyst system and the second magnesium chloride supported Ziegler-Natta catalyst system is from about 50:1 to about 1:50.

10. The process of claim 9 wherein the ratio of the first silica supported Ziegler-Natta catalyst system and the second magnesium chloride supported Ziegler-Natta catalyst system is from about 25:1 to about 1:25.

11. The process of claim 9 wherein the ratio of the first silica supported Ziegler-Natta catalyst system and the second magnesium chloride supported Ziegler-Natta catalyst system is about 1:1.

12. The process of claim 1 wherein the polyethylene is prepared in a loop reactor.

13. The process of claim 1 wherein the polyethylene is prepared in a stirred vessel reactor.

14. The process of claim 1 further comprising changing the rheological breadth of the polyethylene being prepared by changing the ratio of the first silica supported Ziegler-Natta catalyst system and the second magnesium chloride supported Ziegler-Nana catalyst system.

15. The process of claim 14 wherein the rheological breadth parameter, a, is decreased by increasing the amount of first silica supported Ziegler-Natta catalyst system.

* * * * *